(12) United States Patent
Janssen et al.

(10) Patent No.: US 8,236,086 B2
(45) Date of Patent: Aug. 7, 2012

(54) COATED FERTILIZER

(75) Inventors: Richard Johannes Matheus Janssen, Schwalmtal (DE); Stefan Hendrikus Schaafsma, Susteren (NL); Theodorus Marie Leopold Evers, Born (NL)

(73) Assignee: Stamicarbon B.V., Sittard (NL)

( * ) Notice: Subject to any disclaimer, the term of this patent is extended or adjusted under 35 U.S.C. 154(b) by 242 days.

(21) Appl. No.: 12/306,594

(22) PCT Filed: Jun. 29, 2007

(86) PCT No.: PCT/EP2007/005766
§ 371 (c)(1),
(2), (4) Date: Dec. 24, 2008

(87) PCT Pub. No.: WO2008/000492
PCT Pub. Date: Jan. 3, 2008

(65) Prior Publication Data
US 2009/0229330 A1   Sep. 17, 2009

(30) Foreign Application Priority Data
Jun. 30, 2006  (EP) .................... 06013579

(51) Int. Cl.
*C05D 9/00* (2006.01)
*C05D 9/02* (2006.01)
*C05B 7/00* (2006.01)
*C01C 1/18* (2006.01)
*A01N 25/00* (2006.01)

(52) U.S. Cl. ........... 71/64.07; 71/31; 71/32; 71/35; 71/36; 71/54; 71/64.04; 71/64.05; 71/64.06

(58) Field of Classification Search .......... 71/1–30, 71/64.01–64.13
See application file for complete search history.

(56) References Cited

U.S. PATENT DOCUMENTS
6,139,597 A * 10/2000 Tijsma et al. ........... 71/64.11

FOREIGN PATENT DOCUMENTS

| | | |
|---|---|---|
| CN | 1486964 | 4/2004 |
| EP | 1 375 616 | 1/2004 |
| EP | 1 538 197 | 6/2005 |
| JP | 50-129361 | 10/1975 |
| JP | 2000-44878 | 2/2000 |

OTHER PUBLICATIONS

Chinese Office Action with translation dated Dec. 21, 2011.

* cited by examiner

*Primary Examiner* — Jerry Lorengo
*Assistant Examiner* — Jennifer Smith
(74) *Attorney, Agent, or Firm* — Nixon & Vanderhye P.C.

(57) ABSTRACT

Coated fertilizer wherein the fertilizer comprises fertilizer particles coated with a biomass composition comprising 1-60 wt. % solid biomass particles with a $D_{50}$ between 0 and 150 μm and 99-40 wt. % oil, a biomass composition wherein the biomass composition comprises solid biomass particles with a $D_{50}$ between 0 and 150 μm and a process for the production of a biomass composition wherein a biomass composition comprising solid particles having a $D_{50}$ between 30 and 500 μm is filtrated and the residue is grinded until the solid particles have a $D_{50}$ between 0 and 150 μm.

4 Claims, No Drawings

COATED FERTILIZER

This application is the U.S. national phase of International Application No. PCT/EP2007/005766, filed 29 Jun. 2007, which designated the U.S. and claims priority to Europe Application No. 06013579.5, filed 30 Jun. 2006, the entire contents of each of which are hereby incorporated by reference.

The invention is directed to a coated fertilizer.

Various fertilizers are known and also various agents to coat a fertilizer. Fertilizers and coatings for fertilizers are for instance described in Ullmann's Encyclopedia of Industrial Chemistry, 2002 in the chapter about Fertilizer Granulation.

According to this publication a coating is applied to a fertilizer to promote the maintenance of good physical conditions, like the flowability, during storage and handling. The coating agent does not improve the fertilizing properties of a fertilizer. It is therefore, according to Ullmann, preferable to use other means, such as good drying, to avoid caking of the fertilizer particles. Caking is the agglomeration of fertilizer particles by adhesion at their point of contact to form a compact mass that is difficult to break up. Caking has a negative influence on the flowability of a fertilizer.

A disadvantage of the known coating agents for fertilizers is that these coating agents after the field application of the fertilizer stay in the soil and accumulate there, because the known coating agents are slowly degradable. Therefore, the known coating agents are harmful for the environment.

The aim of the invention is to overcome this disadvantage.

The invention is directed to a coated fertilizer comprising fertilizer particles coated with a biomass composition comprising 1-60 wt. % solid biomass particles with a $D_{50}$ between 0 and 150 μm and 99-40 wt. % oil.

In this way it is achieved that the coating of the fertilizer is largely biodegradable and is not harmful for the environment.

A fertilizer that can be coated with the biomass composition is a solid fertilizer comprising particles with a diameter of 0.5-10 mm; in particular with a diameter of 1-5 mm.

Examples of fertilizers are calcium nitrate, ammonium nitrate, calcium ammonium nitrate (CAN), ammonium sulfate nitrate, ammonium sulfate, urea, superphosphate, triple superphosphate, monoammonium phosphate, diammonium phosphate, ammonium polyphosphate, nitrophosphate, potash, potassium phosphate, potassium nitrophosphate, NPK fertilizers and combinations of these fertilizers. These fertilizers can be produced by granulation, prilling and flaking. Preferably, the fertilizer is granular urea or calcium ammonium nitrate (CAN), because these fertilizers are produced and utilized in large quantities and caking during storage and transport is, for these fertilizers, a big problem.

Examples of biomass compositions comprising 1-60 wt. % solid biomass particles with a $D_{50}$ between 0 and 150 μm are:
1. biomass of yeast cells, bacteria cells or fungi cells,
2. biomass of vegetable origin and
3. waste water sludge resulting from the treatment of organic and/or biologic waste.

Also the combination of different biomasses from group 1, 2 and/or group 3 is possible.

More particular a biomass composition of the first group can, for instance, be either the microorganisms as such or the fraction of yeast cells, bacteria cells and/or fungi cells which is insoluble in water and which is obtained by opening of yeast cells, bacteria cells and/or fungi cells by a physical, mechanical, chemical or enzymatic method (or a combination of two or more of these methods) with consequent release of the content of the yeast cells, bacteria cells or fungi cells and by recovering the insoluble fraction. The microorganisms as such are preferably in dried form.

As yeast any yeast may be used as the starting material for the biomass composition. Examples are brewers yeast, wine yeast, bakers yeast and torula yeast. More specific examples are *Sacchromyces cerevisiae, Sacchromyces pastorianus, Sacchromyces rouxii, Sacchromyces carisbergensis, Sacchromyces pombe, Candida utilis, Candida tropicalis, Candida lipolytica, Candida flaveri, Candida boidinii, Kluyveromyces* and *Rhodotrura minuta*. These yeasts can be used alone or in combination.

As bacteria any bacteria may be used as the starting material for the biomass composition. Examples are *Bacillus subtilus* and *E-coli*.

As fungi any fungi may be used as the starting material for the biomass composition. Examples are *Aspergillus Niger* and *Penicillinum Crysogenum*.

More particular a biomass composition of the second group can be, for instance, small particles of any vegetable source. Examples of starting materials for these biomass compositions are fibres, scrap meal or flour of coconut, oil palm seed, linseed, alfalfa, grass, corn, rape, soy and sunflower seed.

More particular a biomass composition of the third group can be, for instance, waste water sludge from fermentation processes; like the waste water sludge from the citric acid production, waste water sludge from the treatment of municipal waste, waste water sludge from agricultural processes; like the potato, sugarbeet and sugarcane industries.

The biomass composition comprises solid biomass particles, which are insoluble, and can, for instance, be obtained after cells are opened and their content is removed.

Recovery of the insoluble fraction may e.g. be performed by a solid-liquid separation method such as centrifugation or filtration, optionally followed by washing the solid fraction with water and/or squeezing and/or extrusion and/or drying of the solid fraction according to standard drying techniques.

Physical, mechanical, chemical or enzymatic methods for opening of the cells are known in the art. Opening by a chemical method may e.g. occur by treatment with salts, alkali and/or one or more surfactants or detergents. Opening by physical method may e.g. occur by heating, e.g. by boiling or autoclaving the cells. Opening by mechanical method may e.g. be performed by using homogenisation techniques. To this purpose, use of high-pressure homogenisers is possible. Other homogenisaton techniques may include mixing with particles, e.g. sand and/or glass beads, and the use of a milling apparatus (e.g. bead mill). Opening of the cells by an enzymatic method (enzymatic hydrolysis) may be performed by subjecting a suspension of the cells to the action of native enzymes and/or added exogenous enzymes, such as proteases, nucleases and glucanases. The conditions to perform enzymatic hydrolysis are dependent on the type of enzyme used and can be easily determined by those skilled in the art.

Depending on the nature of the biomass the solid biomass particles have a particle size with a $D_{50}$ between 30 and 500 μm.

When the solid biomass particles in the biomass composition have a $D_{50}$ smaller than 150 μm the biomass composition can be used as such as a coating agent. When the $D_{50}$ of the solid biomass particles is higher than 150 μm the particles need to be reduced in size.

This can be done by grinding with for instance a pin mill, a ball mill, a homogenizer, a rotor-stator mixer (e.g. an Ultraturrax) or by the use of a high-pressure homogenizer (e.g. a Microfluidizer). Combinations of these grinding methods can also be used.

Before grinding the biomass composition, that can contain water, can be filtrated and dried partly or totally. It is also possible to add (more) water or an other liquid, preferably an oil, to the biomass composition before grinding. A combination of drying the biomass composition and the addition of an other liquid than water, preferably an oil, before grinding is an other possibility. Preferably, the biomass composition comprising at most 25 wt % of water is dispersed in oil and is thereafter grinded.

The biomass composition is grinded until the particles in the biomass composition have a $D_{50}$ between 0 and 150 μm, preferably between 0 and 100 μm, more preferably between 0 and 50 μm and most preferably between 0 and 10 μm.

The biomass composition may comprise other ingredients, such as liquids, fillers and coating agents other than the solid biomass particles. The liquids can be used to disperse the solid biomass particles. Examples of liquids are water, alcohols and oils. Examples of fillers are talcum, lime, kaolin and kieselguhr. Examples of other coating agents are waxes, fatty amines, paraffines, sulfonates, aldehydes or ureas aldehyde resins.

The dispersion liquid used in the biomass composition is an oil. The oil used in the biomass composition can be a natural, a mineral or a synthetic oil. A natural oil is an oil originating from a natural source, for instance vegetable oils, animal oils and fish oils. Examples of vegetable oils are sesame oil, corn oil, soy oil, castor oil, peanut oil, cole seed oil, palm oil, coconut oil, sunflower oil, cotton seed oil, linseed oil, arachidic oil and olive oil. A mineral oil is a product in the distillation of crude oil and is normally a mixture of various fractions. A synthetic oil is an oil specifically prepared for a certain purpose starting from carbon dioxide, methane and/or carbon monoxide using, for instance, a Fisher-Tropsch process. Also a mixture of any of the abovementioned oils may be used.

Preferably, the oil is a natural oil, because this is a biodegradable oil and the coating of the fertilizer will be totally biodegradable when a natural oil is used in the biomass composition.

Coated fertilizers as described above can be prepared according to various processes. To prepare the coated fertilizers according to the invention the biomass is used as such or is grinded until it has a D50 smaller than 150μ, preferably between 0 and 100 μm, more preferably between 0 and 50 μm and most preferably between 0 and 10 μm. If the solid biomass particles in the biomass are too big the coating capability of the biomass composition is less, which results in more caking of the fertilizer particles.

The coated fertilizer can be produced by addition, for example by spraying or dripping, the biomass composition on the fertilizer in, for instance, a pan granulator, a rotating drum or a fluid bed apparatus. Preferably, the coated fertilizer comprises 0.001-10 wt. % coating based on the total weight of the fertilizer; more preferably, 0.1-1 wt. %. Preferably, the coating comprises 1-60 wt. % biomass and 99-40 wt. % oil; more preferably 40-60 wt. % biomass and 60-40 wt. % oil.

The invention is also directed to a biomass composition. This biomass composition is especially suitable for the use as a coating for fertilizers. The biomass composition comprises solid biomass particles. The smaller the particles are the better the coating capabilities of the biomass composition are.

The particles in the biomass composition have a $D_{50}$ between 0 and 150 μm, preferably between 0 and 100 μm, more preferably between 0 and 50 μm and most preferably between 0 and 10 μm.

Further the biomass composition comprises preferably an oil, and more preferably a natural oil, as defined above.

It is also possible to use certain types of the coated fertilizer according to the invention, for instance coated urea particles, as cattle feed instead of as a fertilizer.

The invention will hereafter be explained in more detail in the examples without being limited thereto.

EXAMPLES

Determination of $D_{50}$

The particle size of the biomass was determined according to ISO 13320-1. The $D_{50}$ is the particle size that 50 vol % of the particles in the biomass have.

The particle size of the fertilizer was determined according to ISO-DIS 8397 and ISO 565. The $D_{50}$ is the theoretical sieve opening, having such a mesh size that 50 wt. % of the fertilizer particles is larger and 50 wt. % of the fertilizer particles is smaller than this mesh size.

Determination of Caking Tendency

The caking test was performed as follows:
- a cylindrical sample holder is filled with 100-200 g of material. The sample holder is made of a flexible rubber membrane;
- the sample holder is closed with a lid that is attached to the flexible membrane;
- the sample holder is put upside down and is placed in a pressure chamber;
- because of the flexible membrane pressure can be applied on the sample by applying an overpressure in the chamber the sample is compressed;
- the sample is stored at room temperature during 1 day at an overpressure of 0.1 MPa;
- after storage the caked samples are broken by means of a tensile/consolidating bench. This is done by lowering a piston on the sample holder and recording the stress needed to break the sample. The maximum value recorded is the caking tendency expressed in MPa (i.e. the maximum force divided by the top surface of the sample holder with a diameter of 40 mm).

The value for the caking tendency preferably is below 0.08 MPa, more preferably below 0.05 MPa and most preferably below 0.025 MPa.

Product List

Fertilizer
  Calcium Ammonium Nitrate (CAN 27, Nutramon) a standard nitrogen fertilizer of OSM Agro, the Netherlands with a $D_{50}$ of 3.6 mm.
  Ammonium nitrate 33.5 (AN) a standard nitrogen fertilizer of DSM Agro, the Netherlands with a $D_{50}$ of 3.6.
  Urea a standard nitrogen fertilizer of DSM Agro, the Netherlands with a $D_{50}$ of 3.5 mm.
  Ammonium nitrate with gypsum (NS, Dynamon S) a standard nitrogen fertilizer of DSM Agro, the Netherlands with a $D_{50}$ of 3.6 mm.

Biomass
  Type 1
    Biomass of *Aspergillus Niger*; the biomass was filtered until a water content of 30 wt% and thereafter dried further until a water content of 5 wt %.

Type 2
  Celitex® suspension; obtained from DSM Food Specialties Delft, The Netherlands
Oil Palm
  Meal of oil palm seeds obtained from Cargill, the Netherlands
Sludge
  Sludge from the waste water treatment of the citric acid production of Citric Belgique S.A. in Tienen, Belgium
Oil
  Mineral parafinnic process oil; Solvent 700 of Total.
  Linseed oil
Talcum
  Talcum Luzenac 2S of Talc de Luzenac.
Additive
  Fatty Amine, Genamin SH 100 of Clarifant, Benelux
Milling and Homogenizing Equipment
  Pinn mill: Pallman PXL 18 (P)
  Rotor-stator mixer: Ultraturrax of IKA Labortechnik, type T50 with standard dispersing tool GM (U)
  High-pressure homogenizer: Microfluidizer of Microfluidics Inc. (M)

Preparation of the Coated Fertilizer

The biomass was dispersed in oil by using milling or homogenizing equipment to prepare the biomass composition.

The biomass composition was heated to 60° C. and was added dropwise to or sprayed onto 1.5 kg of fertilizer particles that were kept moving in a rotating drum (35 rpm, diameter 25 cm, length 15 cm) at a temperature of 35° C. If present according to the example or experiment, two minutes after addition of the biomass composition to the fertilizer particles talcum was added. Thereafter, the fertilizer was rotated for two more minutes. The sample was released from the rotating drum and was stored to cool down to room temperature. Fertilizer particles were obtained comprising a coating comprising a biomass composition and, possibly, talcum.

Examples I and II and Comparative Experiments A-E

The homogenizing for Examples I and II has been performed by using a Microfluidizer; for experiment E with a rotor-stator mixer. CAN 27 is used as the fertilizer.

TABLE 1

| Example | Biomass | Oil | Coating (wt. %) | Biomass In Coating (wt. %) | Dispersion | $D_{50}$ of Particle Size Biomass (μm) | Talcum (wt. %) | Additive (wt. %) | Caking Tendency (MPa) |
|---|---|---|---|---|---|---|---|---|---|
| I | Type 1 | Solvent | 0.6 | 36 | M | 7.7 | 0.6 | | 0.022 |
| II | Type 1 | Solvent | 0.15 | 23 | M | 6.7 | 0.3 | 0.012 | 0.014 |

| Comparative Experiment | Biomass | Oil | Coating (wt. %) | Biomass In Coating (wt. %) | Dispersion | $D_{50}$ of Particle Size Biomass (μm) | Talcum (wt. %) | | Caking Tendency (MPa) |
|---|---|---|---|---|---|---|---|---|---|
| A | — | — | — | — | — | — | — | | 0.103 |
| B | — | Solvent | 0.6 | — | — | — | — | | 0.058 |
| C | — | Solvent | 0.6 | — | — | — | 0.6 | | 0.039 |
| D | — | Solvent | 0.1 | — | — | — | 0.3 | 0.012 | 0.027 |
| E | Type 1 | Water instead of oil | 0.3 | 36 | U | 6.7 | — | | 0.084 |

By comparing experiments A, B, C and E with example I and experiment D with example II it can be seen that a coating comprising, apart from oil, additive and talcum, also biomass gives the best performance in the test for caking tendency.

Examples III-IV and Comparative Experiment F

The milling and/or homogenizing equipment that is used according to the examples and experiment is listed in Table 2 below. CAN 27 is used as the fertilizer.

TABLE 2

| | Biomass | Oil | Coating (wt. %) | Biomass In Coating (wt. %) | Dispersion | $D_{50}$ of Particle Size Biomass (μm) | Talcum (wt. %) | Caking Tendency (MPa) |
|---|---|---|---|---|---|---|---|---|
| Example | | | | | | | | |
| III | Type 1 | Solvent | 0.50 | 40 | U | 65.8 | 0.6 | 0.047 |
| IV | Type 1 | Solvent | 0.50 | 40 | M | 7.7 | 0.6 | 0.024 |
| Comparative Experiment | | | | | | | | |
| F | Type 1 | Solvent | 0.50 | 40 | P | 160 | 0.6 | 0.087 |

Comparing experiment F with examples III and IV it can be seen that the smallest particle size of the biomass in the coating gives the best performance in the test for caking tendency.

Examples V-IX

The homogenizing for Examples V-IX has been performed by using a Microfluidizer. CAN 27 is used as the fertilizer.

TABLE 3

| Example | Biomass | Oil | Coating (wt. %) | Biomass in Coating (wt. %) | Dispersion | $D_{50}$ of Particle Size Biomass (μm) | Talcum (wt. %) | Additive (wt. %) | Caking Tendency (MPa) |
|---|---|---|---|---|---|---|---|---|---|
| V | Type 2 | Solvent | 0.50 | 40 | M | 8.2 | 0.6 | — | 0.019 |
| VI | Type 2 | Solvent | 1.00 | 40 | M | 8.2 | 0.6 | — | 0.009 |
| VII | Type 1 | Solvent | 0.2 | 23 | M | 6.7 | 0.1 | 0.01 | 0.027 |
| VIII | Type 1 | Solvent | 0.15 | 23 | M | 6.7 | 0.1 | 0.01 | 0.029 |
| IX | Type 1 | Solvent | 0.10 | 23 | M | 6.7 | 0.1 | 0.01 | 0.034 |

Examples IV to IX show that by raising the amount of coating on the fertilizer the caking tendency is improved.

Examples X-XII and Comparative Experiments G-J

The homogenizing for Examples X-XII has been performed by using a Microfluidizer. CAN 27 is used as the fertilizer. For the example and experiment with urea the determination of the Caking Tendency was done after storage of the samples during 3 days at an overpressure of 0.2 MPa.

TABLE 4

| | Fertilizer | Biomass | Oil | Coating (wt. %) | Biomass in Coating (wt. %) | Dispersion | $D_{50}$ of Particle Size Biomass (μm) | Talcum (wt. %) | Additive (wt. %) | Caking Tendency (MPa) |
|---|---|---|---|---|---|---|---|---|---|---|
| Example | | | | | | | | | | |
| X | Urea | Type 1 | Solvent | 0.15 | 23 | M | 6.5 | 0.3 | 0.01 | 0.011 |
| XI | AN | Type 1 | Solvent | 0.15 | 23 | M | 6.5 | 0.3 | 0.01 | 0.018 |
| XII | NS | Type 1 | Solvent | 0.15 | 23 | M | 6.5 | 0.3 | 0.01 | 0.005 |
| Comparative Experiment | | | | | | | | | | |
| G | Urea | — | — | — | — | — | — | — | — | 0.051 |
| H | AN | — | — | — | — | — | — | — | — | 0.211 |
| J | NS | — | — | — | — | — | — | — | — | 0.099 |

By comparing example X, XI and XII with respectively comparative experiment G, H and J it can be seen that using a coating comprising biomass gives a clear improvement of the caking tendency for various fertilizers.

Examples XIII-XV and Comparative Experiment K

The homogenizing for Examples X-XII has been performed by using a Microfluidizer. CAN 27 is used as the fertilizer.

TABLE 5

| | Biomass | Oil | Coating (wt. %) | Biomass in Coating (wt. %) | Dispersion | $D_{50}$ of Particle Size Biomass (μm) | Talcum (wt. %) | Additive (wt. %) | Caking Tendency (MPa) |
|---|---|---|---|---|---|---|---|---|---|
| Example | | | | | | | | | |
| XIII | Type 1 | Solvent | 0.15 | 23 | M | 6.7 | 0.3 | 0.01 | 0.014 |
| XIV | Palm oil | Solvent | 0.15 | 23 | M | 21 | 0.3 | 0.01 | 0.019 |
| XV | Sludge | Solvent | 0.15 | 23 | M | 4.0 | 0.3 | 0.01 | 0.014 |
| Comparative Experiment | | | | | | | | | |
| K | — | Solvent | — | — | — | — | 0.3 | 0.01 | 0.027 |

Examples XIII, XIV and XV show that biomass of different origin can be applied in the coating composition.

The invention claimed is:

1. Coated fertilizer which comprises fertilizer particles coated with a biomass composition comprising 1-60 wt. % solid biomass particles with a $D_{50}$ between 0 and 150 μm and 99-40 wt. % oil, wherein the biomass is dispersed in the oil, and wherein the biomass is of vegetable origin or waste water sludge resulting from treatment of organic and/or biologic waste.

2. Coated fertilizer according to claim 1, which comprises 0.001-10 wt. % of the biomass composition based on the total weight of the fertilizer.

3. Coated fertilizer according to claim 1, wherein the oil is a natural oil.

4. Coated fertilizer according to claim 1, wherein the solid biomass particles are of vegetable origin.

* * * * *